Patented June 6, 1933

1,912,962

UNITED STATES PATENT OFFICE

JEAN BAER, OF USTER, SWITZERLAND

PROCESS IN THE MANUFACTURE OF WAX LIKE BODIES

No Drawing. Application filed November 1, 1928, Serial No. 316,626, and in Switzerland November 8, 1927.

I have found that a wax-like body can be obtained which has a greater hardness and a higher fusion point than bees-wax and carnauba-wax if halogen derivatives of the saturated hydrocarbons $C_nH_{2n+2}$ are caused to react with an ammonium sulphide solution at ordinary temperature or in the warmth. As parent materials, I may use methylene-dichloride, methylene-dibromide, methylene di-iodide, ethylene-dichloride, ethylene-dibromide, ethylene di-iodide and so on. Also mixtures thereof or mixtures of such halogenized compounds with formaldehyde, acetaldehyde etc. may be used for this purpose.

The following examples illustrate the process, the parts being by weight.

*Example I.*—100 parts of a commercial ammonium sulphide solution, that is a saturated ammonium sulphide solution of a specific weight of about 0.990 $(NH_4)_2S=34.1\%$ and free $NH_3=2.8\%$, are diluted with 100 parts of water and this solution is then brought into reaction at room temperature with 4 parts of ethylene-dichloride. The mass of reaction is allowed to stand until a wax-like body separates out which for purifying purposes is treated in the warmth with an alkali and thereupon dried and melted to a homogeneous mass.

*Example II.*—A mixture of 100 parts of a diluted ammonium sulphide solution, of 4 parts of ethylene-dichloride and of 4 parts of an aqueous formaldehyde solution of 40% by volume is heated to a moderate temperature, for example about to 50–70° C., whereby after a short time a separation of a wax-like body takes place. Its purification is obtained according to Example I. The heating of the reaction mass can also be performed in an autoclave.

*Example III.*—100 parts of a commercial ammonium sulphide solution are caused to react with 2 parts of ethylene-dichloride, 2 parts of formaldehyde and 2 parts of acetaldehyde at room temperature. The purification of the wax-like body thus obtained can take place as in Example I.

In all these examples, any one of the aforesaid substances can be used. The obtained body shows in all cases a wax-like constitution. Dilute ammonium sulphide solutions are preferable.

What I claim is:—

1. A process for the manufacture of wax-like bodies, consisting in causing an ammonium sulphide solution to react upon a dihalogen derivative of the saturated hydrocarbons $C_nH_{2n+2}$.

2. A process for the manufacture of wax-like bodies, consisting in causing an ammonium sulphide solution to react upon ethylenedichloride.

3. A process for the manufacture of wax-like bodies, consisting in causing an ammonium sulphide solution to react upon a mixture of a dihalogen derivative of the saturated hydrocarbons $C_nH_{2n+2}$ with an aldehyde.

4. A process for the manufacture of wax-like bodies, consisting in causing an ammonium sulphide solution to react upon a mixture of ethylenedichloride with an aldehyde.

5. The wax-like bodies such as obtained by the reaction of an ammonium sulphide solution with a dihalogen derivative of the saturated hydrocarbons $C_nH_{2n+2}$, said bodies having a greater hardness and a higher fusion point than bees and carnauba wax.

In witness whereof I have hereunto signed my name this 22nd day of October 1928.

JEAN BAER.